Patented May 13, 1952

2,596,936

UNITED STATES PATENT OFFICE 2,596,936

GLOWPROOFING COMPOSITION COMPRISING PHENOL-ALDEHYDE RESINS AND WATER-INSOLUBLE REACTION PRODUCT OF PHOSPHORYL CHLORIDE AND ANHYDROUS AMMONIA

Morris L. Nielsen and Howard K. Nason, Dayton, Ohio, assignors to Monsanto Chemical Company, St. Louis, Mo., a corporation of Delaware No Drawing. Application December 30, 1948, Serial No. 68,405

8 Claims. (Cl. 260—30.6)

This invention relates to new compositions of matter and to the manner of producing them. The invention specifically relates to materials having utility in flameproofing compositions with the particular objective of reducing the tendency to exhibit after-glow.

It is an object of the invention to provide a composition of matter which may be combined with, or applied to combustible products to reduce the danger of after-glow, which is known to be a property common to resinous materials. The invention likewise relates to a preferred method for producing these compositions.

In accordance with the terminology which has developed in this field "flameproofing" means the treatment of a material so that it is resistant to the propagation of flame across its surface after the igniting flame has been removed; that is, a properly flameproofed material will not support combustion independently of an external source of heat. In contact with an open flame, however, or at elevated temperatures, flameproofed organic materials can be expected to char and decompose.

The technical term "flameproofing" is used herein according to the definitions and requirements set forth in the ASTM Standards 1944 Yearbook under Test (D626-41T) BS III, 1930 and also the Army Quartermaster Corps Test JQD 242.

In the problem of reducing the danger of fire in the use of various resins, particularly in the case of resins which do not contain nitrogen, it is obvious that the large proportion of carbon, hydrogen and oxygen which are present in such resins, renders these materials particularly susceptible to combustion. Even such resinous materials as the phenolic resin class of materials have been found to glow excessively after they have been in contact with a flame, so that such a slow combustion or after-glow may entirely consume the resinous material, even where only a portion thereof had actually been consumed by flaming combustion. Such effects are particularly dangerous in coating compositions or other extended or dispersed surfaces of large area, which may by this means propagate a fire even though it may appear to have been extinguished at one point, since the after-glow phenomenon may permit the fire to be propagated to other portions of the coating film, where other combustible materials may cause flaming combustion to again take place.

It is known that metallic oxides, such as antimony oxide which have been utilized in some flameproofing treatments, in combination with polyvinyl chloride or chlorinated paraffin, aid in the catalytic effect which appears to be the cause of the "after-glow" phenomenon. For this reason a flameless combustion may occur even in a treated material after the igniting flame has been removed from the said material. In studies made in the flameproofing of cellulosic materials this phenomenon has been described as a "catalytic incandescent oxidation of carbon remaining after the initial pyrogenic decomposition of the cellulose." Thus, the metal oxides that are instrumental in bringing about the desirable suppression of the initial fire or pyrogenic decomposition may be primarily responsible for the production of an undesirable after-glow or "flameless" combustion.

The present invention provides compositions which reduce the after-glow in combustible materials such as resins, particularly the group of phenol-formaldehyde and resorcinol-formaldehyde resins.

The process of the invention may be carried out to obtain flameproofed products which avoid the prior art difficulty of after-glow.

It has been found that flameproofing resinous compositions employed in combination with an otherwise combustible base material may be made with a negligible after-glow period if combinations include the reaction product of phosphoryl chloride and ammonia, as described by Mellor in Comprehensive Treatise on Inorganic and Theoretical Chemistry, 8, 713 (Longmans, Green and Company; New York, 1928). In particular the reaction product of phosphoryl chloride and ammonia which has been designated as polyphosphorylamide, and which is an insoluble, infusible, white powder, is of utility in this relationship. The preparation of this material is described in co-pending application Serial No. 68,402, filed December 30, 1948 and assigned to the same assignee as is the present case. Polyphosphorylamide may be produced as an insoluble material which in contact with water exhibits a neutral or slightly alkaline reaction, without, however, undergoing any appreciable hydrolysis at room temperature. The process is most conveniently carried out by passing gaseous ammonia into a solution of phosphorus oxychloride (also called phosphoryl chloride) dissolved in a hydrocarbon solvent boiling above 200° C. until at least 5 moles of ammonia per mole of phosphorus oxychloride have been added and combined therewith. It has been found that a definite compound is formed at this stage, although more ammonia may be added. The reaction is best carried out at temperatures below 100° C. and preferably above 20° C., utilizing normal pressure or elevated pressure. Since exothermic reaction heat is liberated it is desirable to cool the hydrocarbon solution during the reaction in order to maintain the temperature thereof between the above limits. The product formed by this initial reaction is a fine, white powder which consists of a mixture of a nitrogen-phosphorus containing body and ammonium chloride. The nitrogen-phosphorus containing body is at this stage water-soluble and alkaline in reaction. If desired, the reaction product may now be separated by filtration or by centrifuging from the hydrocarbon and the separated product treated according to the second step of our process.

Preferably the heating step may be carried out upon the reaction product produced by the first step while the product is still suspended or mixed with the original hydrocarbon solvent. This results in better yields and simplified operation, since the material may be handled more easily and without losses. The second step of our process involves heating the product produced in the first step to a temperatue above 155° C., but below a temperature of 250° C., either at atmospheric or superatmospheric pressure. During the heating period, a small amount of ammonia is evolved which may be recovered and reused in the process. During the heating step the nitrogen-phosphorus product apparently undergoes a polymerization or molecular rearrangemnt, being converted thereby into a water-insoluble product of higher molecular weight.

Example A

One hundred parts of phosphoryl chloride was dissolved in 300 parts of kerosene of commercial grade. The kerosene had a boiling range of about 150° to 260° C. Anhydrous ammonia gas was then passed into the kerosene solution at a slow rate of addition, and simultaneously therewith, the solution was cooled in order to maintain the temperature below about 80° C. At the same time, efficient agitation of the solution was maintained. The addition of ammonia was continued in this manner until 5 moles of ammonia had been reacted with the phosphoryl chloride. The reaction product was insoluble in kerosene and appeared as a white powder suspended therein.

After completion of the ammonia addition, the reaction mixture, while remaining suspended in kerosene, was heated to a temperature of 200° C. After the temperature had reached 200° C., heating was discontinued and the mixture permitted to cool. During the heating period, some ammonia was evolved, the nitrogen-phosphorus product apparently undergoing polymerization and becoming water-insoluble. At the end of the heating period, which may be carried out for a period of from one-fourth to three hours, preferably one to three hours, the solids were removed from the kerosene by filtration or centrifuging. The product was next washed with water in sufficient amount so as to dissolve the ammonium chloride present in the product. The washing operation may also be followed by a heating step which is designed to dry the product and also to remove traces of the kerosene or other hydrocarbon. A convenient method for removing the hydrocarbon consists in steaming the product while it is contained in a rotating centrifuge.

The nitrogen-phosphorus containing product, resulting from the present process, is substantially insoluble in water as well as organic solvents. It may be suspended or dispersed in water and will then exhibit a pH which is substantially neutral or alkaline in reaction. The final product is free from chlorine as a result of the heating and polymerization step, which makes it possible for the ammonium chloride to be completely removed to leave only the condensation product consisting essentially of nitrogen, oxygen, hydrogen and phosphorus. The nitrogen-phosphorus atomic ratio is approximately 1.80:1, but may be varied within the range of 1.5:1 to 2.0:1 by variation of the amount of $NH_3$ initially reacted with the $POCl_3$ and this product to some degree polymerized, and then subjected to heating as described above, to complete the polymerization. The preferred N:P ratio suitable for most purposes varies from 1.70:1 to 1.95:1.

The phosphorus-containing reaction product of phosphoryl chloride and ammonia functions in the combination with the phenolic type resin to reduce the above-described phenomenon of afterglow.

The combination products based upon the phenolic resin in association with the reaction product of phosphoryl chloride and ammonia are products which may be utilized in producing sheets of resinous or plastic materials or in the manufacture of formed, plastic articles of various types such as may be produced by molding, extrusion, casting, stamping and other processes.

The composition of matter employed in the present application may be prepared by the dispersion or mixing of the polyphosphorylamide in the phenolic condensation product while in the liquid or paste form. However, it may also be mixed with the resin while the latter is in the form of powder or granules.

It has been found that when such combinations are subjected to a flame, a chemical reaction occurs, with the result that the flammability characteristic of the otherwise combustible resin is greatly reduced, and that the phosphorus compound which is initially infusible and insoluble aids in extinguishing fire and furthermore entirely eliminates any tendency to after-glow.

Illustrative of the combination of the resinous materials, together with the reaction product of phosphoryl chloride and ammonia, the following examples show certain embodiments thereof without, however, being limitative of the scope of the invention.

Example 1

A suspension prepared from a heat-reactive condensation product of resorcinol and formaldehyde in the form of a paste. Such materials are described in C. Ellis, Chemistry of Synthetic Resins, pages 371–373 (Reinhold Publishing Company (1933)). One hundred parts of the condensation product were mixed with 5 parts of the polyphosphorylamide. The combination was applied as a coating to metal panels and dried. These test panels, when subjected to a flame test similar to that shown by R. W. Little in Flameproofing Textile Fabrics, pages 111–115 (Reinhold Publishing Company (1947)), gave no afterflame or after-glow.

Example 2

A phenol-formaldehyde molding powder of a type shown in Ellis, at pages 277–290 was mixed with 30%, by weight, of polyphosphorylamide. The mixture may be molded or formed into any desired shape to give resinous products which do not burn and which do not permit any after-glow or smoldering.

*Example 3*

The combination mixture of Example 2 was dispersed on glass fibers of small diameter and the treated material formed into a block for use as a heat-insulating material. This material, when subjected to a flame, did not burn, and did not exhibit any after-glow. A control sample of phenol-formaldehyde on glass fibers, identical but for the absence of the polyphosphorylamide, showed a prolonged glowing period after removal from a test flame. Glass fibers treated in the manner of the present example, such as by the use of from 3% to 50%, by weight, of the phenolic resin-polyphosphorylamide, have also been found to be useful as air filters which do not burn and will not glow after contact with a flame. Other siliceous materials, particularly in attenuated form, such as fibrous silica, mineral wool, and cellular glass, may also be bonded to give a glowproof product by means of the present combination of a phenolic condensation product, together with a condensation product of phosphoryl chloride as set forth above.

The proportion of the phosphorus compound in association with the phenolic resin may be varied over a wide range, depending upon the degree of fire-retarding and glowproofing effects desired. It has been found, however, that the essential composition consisting of the phenolic resin, such as phenol-formaldehyde, resorcinol-formaldehyde and mixtures of the same, and the POCl$_3$-ammonia reaction product should contain at least 3 parts, and preferably not more than 90 parts, by weight, of said POCl$_3$-ammonia condensation products per 100 parts by weight of the final mixture.

This application contains subject matter in common with certain other applications assigned to the same assignee as is the present application:

Serial No. 68,402, filed December 30, 1948, relating to the water-insoluble composition of matter resulting from the reaction of phosphoryl chloride and anhydrous ammonia;

Serial No. 68,403, filed December 30, 1948, relating to a water paint comprising a dispersion of the water-insoluble reaction product of phosphoryl chloride and anhydrous ammonia in combination with water-soluble, nitrogen-containing resinous materials;

Serial No. 68,404, filed December 20, 1948, relating to a flameproofing treatment for cotton by the application thereto of the water-insoluble reaction product of phosphoryl oxychloride and anhydrous ammonia;

Serial No. 68,404, filed December 30, 1948, relating to intumescing compositions comprising the combination of a nitrogen-containing resin in combination with the water-insoluble reaction product of phosphoryl chloride and anhydrous ammonia;

Serial No. 68,407, filed December 30, 1948, relating to water paints based upon the combination of the water-insoluble reaction product of phosphoryl chloride and anhydrous ammonia together with water-soluble alkyd resins derived from the reaction of citric acid and glycerine;

Serial No. 68,408, filed December 30, 1948, relating to water emulsion paints comprising the combination of a nitrogen-containing resin and the water-insoluble reaction product of phosphoryl chloride and anhydrous ammonia together with polyhydroxy compounds such as pentaerythritol;

Serial No. 68,409, filed December 30, 1948, relating to a coating composition comprising an organic solvent containing organic film-forming resins in combination with the water-insoluble reaction product of phosphoryl chloride and anhydrous ammonia;

Serial No. 68,410, filed December 30, 1948, relating to the combination of the water-insoluble reaction product of phosphoryl chloride and anhydrous ammonia together with chlorinated rubber;

Serial No. 68,411, filed December 30, 1948, relating to flameproofed cloth having deposited thereon the combination of the water-insoluble reaction product of phosphoryl chloride and anhydrous ammonia together with antimony oxide and polyvinyl chloride;

Serial No. 136,135, filed December 30, 1949, relating to glowproofing compositions comprising the combination of the reaction product of phosphoryl chloride and anhydrous ammonia together with antimony oxide and chlorinated paraffins;

Serial No. 136,136, filed December 30, 1949, relating to compositions comprising the combination of the reaction product of phosphoryl chloride and anhydrous ammonia together with compounds having free hydroxy radicals such as pentaerythritol.

Having now described certain specific forms of the invention, it is to be understood that the invention is not to be limited to the specific forms of compositions herein described or specifically covered by the claims.

What is claimed and is desired to be protected by Letters Patent of the United States is:

1. A glowproofing composition comprising the combination of a phenol-aldehyde resin and the water-insoluble reaction product of phosphoryl chloride and anhydrous ammonia, said water-insoluble product having a N/P ratio between 1.5:1 and 2.0:1.

2. A glowproofing composition comprising the combination of a phenol-aldehyde resin of the group consisting of phenol-formaldehyde, and resorcinol-formaldehyde and mixtures of the same, which resin is associated with the water-insoluble reaction product of phosphoryl chloride and anhydrous ammonia, said water-insoluble product having a N/P ratio between 1.5:1 and 2.0:1.

3. A glowproofing composition comprising the combination of a resorcinol-formaldehyde resin and the water-insoluble reaction product of phosphoryl chloride and anhydrous ammonia, said water-insoluble product having a N/P ratio between 1.5:1 and 2.0:1, which latter reaction product is present to the extent of 3% to 90% by weight in said composition.

4. A glowproofing composition comprising the combination of a phenol-formaldehyde resin and the water-insoluble reaction product of phosphoryl chloride and anhydrous ammonia, said water-insoluble product having a N/P ratio between 1.5:1 and 2.0:1, which latter reaction product is present to the extent of 3% to 90% by weight of said composition.

5. The method of producing a glowproof, non-combustible material which comprises treating said material with a dispersion containing the insoluble, heat-reaction product of phosphoryl chloride and anhydrous ammonia, said water-insoluble product having a N/P ratio between 1.5:1 and 2.0:1, which product is associated with a phenol-aldehyde resin.

6. An insulating material comprising glass fibers rendered glow-proof by the dispersion thereon of a phenol-aldehyde resin associated with the insoluble, heat-reaction product of phosphoryl chloride and anhydrous ammonia, said water-insoluble product having a N/P ratio between 1.5:1 and 2.0:1.

7. A composition of matter comprising an otherwise glow-susceptible phenol-aldehyde resin, which resin has been rendered glowproof by the addition thereto of from 3% to 90% by weight of the water-insoluble reaction product of phosphoryl chloride and anhydrous ammonia, said water-insoluble product having a N/P ratio between 1.5:1 and 2.0:1.

8. An air filter comprising an attenuated, siliceous material in combination with a phenol-aldehyde resin and the water-insoluble condensation product of phosphoryl chloride and anhydrous ammonia, said water-insoluble product having a N/P ratio between 1.5:1 and 2.0:1

MORRIS L. NIELSEN.
HOWARD K. NASON.

REFERENCES CITED

The following references are of record in the file of this patent:

UNITED STATES PATENTS

| Number | Name | Date |
| --- | --- | --- |
| 2,052,886 | Leroy | Sept. 1, 1936 |
| 2,163,085 | Cupery | June 20, 1939 |
| 2,413,163 | Bacon | Dec. 24, 1946 |

FOREIGN PATENTS

| Number | Country | Date |
| --- | --- | --- |
| 181,547 | Switzerland | Mar. 16, 1936 |

OTHER REFERENCES

Mellor, Comprehensive Treatise on Inorganic and Theoretical Chemistry, vol. 8 (1928); pages 704–720.